United States Patent [19]

Harris et al.

[11] Patent Number: 5,205,442

[45] Date of Patent: Apr. 27, 1993

[54] HAND-HELD DISPENSING PUMP FOR SPRAY BOTTLES

[75] Inventors: Clark E. Harris, Fairport; Michael W. Didas, Rochester, both of N.Y.; Anthony J. Imperto, Purdys, N.J.

[73] Assignee: Eastman Kodak Company, Rochester, N.Y.

[21] Appl. No.: 674,839

[22] Filed: Mar. 18, 1991

[51] Int. Cl.$^5$ ............................................. G01F 11/42
[52] U.S. Cl. .................... 222/341; 222/380; 222/382; 222/385; 239/333; 239/443
[58] Field of Search ............. 222/340, 341, 380, 382, 222/383, 385; 239/333, 436, 443

[56] References Cited

U.S. PATENT DOCUMENTS

| | | | |
|---|---|---|---|
| 3,840,157 | 10/1974 | Hellenkamp | 222/385 X |
| 3,940,029 | 2/1976 | Horvath | 222/340 |
| 4,225,061 | 9/1980 | Blake et al. | 222/383 X |
| 4,227,650 | 10/1980 | McKinney | 222/380 X |
| 4,479,593 | 10/1984 | Bundschuh | 222/380 X |
| 4,596,344 | 6/1986 | Corsette | 222/340 |
| 4,646,969 | 3/1987 | Sorm et al. | 222/340 X |
| 5,038,965 | 8/1991 | Cater | 222/385 X |

FOREIGN PATENT DOCUMENTS

| | | | |
|---|---|---|---|
| 716797 | 10/1966 | Italy | 222/380 |
| 8908506 | 9/1989 | World Int. Prop. O. | 222/341 |

Primary Examiner—Andres Kashnikow
Assistant Examiner—Joseph A. Kaufman
Attorney, Agent, or Firm—Millen, White, Zelano & Branigan

[57] ABSTRACT

A dispensing pump having a minimal number of molded plastic components is configured to have a relatively low profile when mounted on a spray container. The pump includes a base having a chamber depending downwardly therefrom within which is received a piston biased by a spring. The piston has a piston rod which extends upwardly through the base for coupling with one leg of a L-shaped handle pivoted on the base. Upon squeezing the handle, the handle rotates to lift the piston to pressurize liquid in the container. The liquid is dispensed laterally of the base through a valve body which includes a rotatable valve element seated therein. The rotatable valve element rotates about an axis perpendicular to the valve body and includes both an opening for releasing a stream of liquid from the pump and an opening for releasing a spray of liquid from the pump. In order to refill the chamber with liquid from the container, a dip tube extends from the base and is in communication with the chamber. A check valve is formed by a vane extending from the valve body and overlying the dip tube to open when a vacuum occurs within the chamber.

3 Claims, 4 Drawing Sheets

HAND-HELD DISPENSING PUMP FOR SPRAY BOTTLES

TECHNICAL FIELD

The instant invention relates to hand-held dispensing pumps for spray bottles. More particularly, the instant invention relates to hand-held dispensing pumps for spray bottles in which the cost of such pumps is minimized by reducing the number of component parts and simplifying assembly.

BACKGROUND ART

Due to the suspicion that chlorofluorocarbons (CFCs) contribute to the loss of ozone in the atmosphere, many products or types of products which were, or might have been, propelled from containers pressurized with chlorofluorocarbons are now pumped from containers with handpumps. As manufacturers have sought to improve these handpumps, the handpumps have become relatively expensive due to increasing complexity and increasing numbers of parts. In addition, handpumps usually have a relatively high profile which results in containers with the pumps attached consuming shelf space not only for consumers but for retailers, wholesalers and manufacturers. Most of the high profile handpumps now on the market, stack components thereof outside of the neck of the container resulting in the relatively high profiles. In addition, since these pumps utilize relatively large number of components, assembly time and complexity add considerably to costs.

The patent literature includes a number of patents which disclose structures and functions which proport to solve various difficulties in the art. For example, U.S. Pat. Nos. 4,072,252; 4,077,549 and 4,728,009, each disclose the same general type of pump now widely used and widely available in which the pump has a relatively high profile and a relatively large number of parts.

U.S. Pat. No. 3,384,081 to Castiglione discloses a handpump which has a piston that is pushed from the bottom rather than pulled from the top to lift the piston against the bias of a spring. The pump of this patent does not have a configuration and arrangement of parts which make the pump suitable for use with currently available spray bottles.

SUMMARY OF THE INVENTION

It is an object of the instant invention to provide a new and improved hand-held dispensing pump for containers such as spray bottles, wherein the dispensing pump has a minimum number of parts which are easy to assemble and provide a pump of a relatively low profile.

With this object and other objects in mind, the instant invention contemplates a dispensing pump for mounting on the mouth of a container, wherein the dispensing pump comprises a base having a chamber extending longitudinally for receipt through the mouth of the container. The base has a sleeve extending laterally with respect to the chamber and in communication therewith for dispensing fluid from the container. A piston is provided within the container, the piston having an axially projecting rod extending therefrom into the base and being biased away from the base by a spring. A handle is moveably mounted on the base and engages a rod for moving the piston upward against the bias of the spring when pressed toward the container. A dispensing valve is positioned within the sleeve to control the size of fluid droplets and to allow liquid to refill the chamber upon releasing the handle.

Preferably, the components of the above-described dispensing pump molded of plastic.

In a preferred embodiment, the dispensing valve is configured as a rotary valve element which rotates about an axis normal to the sleeve in which it is seated.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
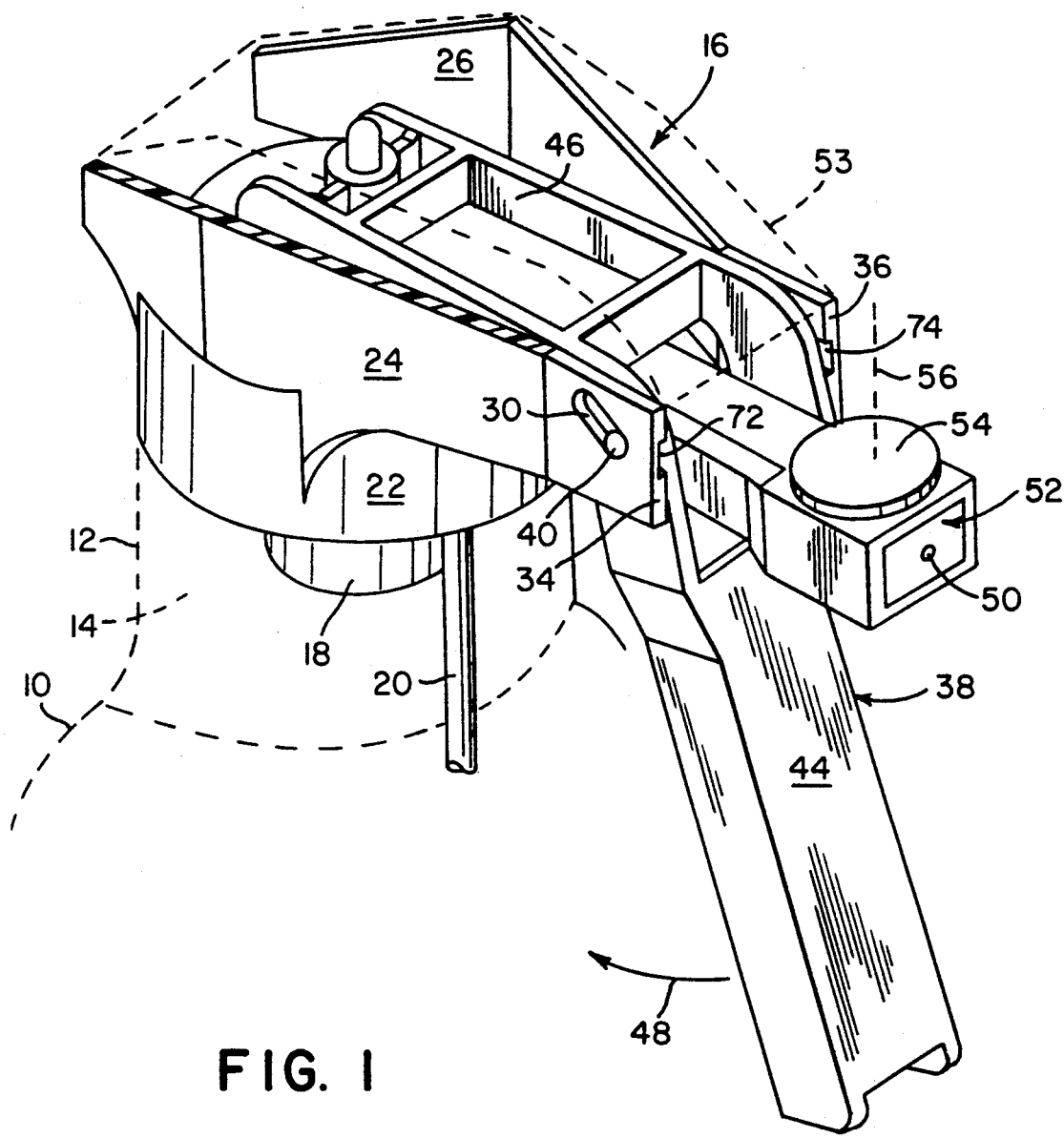
FIG. 1 is a perspective view, partially in section, of a pump configured in accordance with the principles of the instant invention and attached to the neck of a container which contains liquid to be dispensed by the pump.

Referring now to FIG. 1, there is shown a container 10 having a neck 12 with a mouth 14 therein. Mounted on the neck 12 is a pump, designated generally by the numeral 16, configured in accordance with the principles of the instant invention. Pump 16 has a cylindrical proportion 18 and a dip tube 20 which extend through the mouth 14 from an internally threaded base 22. The base 22 threads on external threads of the neck 12 of the container 10. The dip tube 20 extends substantially to the bottom of container 10 to continually replenish the pump 16 as liquid within the container is consumed.

Secured to the base 22 of the pump 10 are a pair of side flanges 24 (part of which is cut away for clarity) and 26 which have arcuate slots 30 and 32 (FIG. 2), respectively, approximate front ends 34 and 36, respectively. An L-shaped handle, designated generally by the numeral 38, is rotatably and slidably mounted in the arcuant slots 30 and 32 via pins 40 and 42, respectively. The L-shaped handle 38 has a lever or trigger portion 44 and an actuating portion 46. When the person using THE pump pivots the lever 44 toward the bottle 10 in the direction of arrow 48, liquid within the pump is ejected through an orifice 50 and a main valve body, designated generally by the numeral 52. Upon releasing the handle 44, a vacuum is created within the pump 16 which vacuum sucks liquid up the dip tube 20 and into the cylindrical portion 18 of the pump 16. Upon again squeezing the handle 44 by rotating the handle in the direction of arrow 48, another charge of liquid is ejected through the orifice 50. Shown in dotted lines is a cover which protects and conceals the working components of the pump 10.

In order to control the characteristics of the nozzle, a rotary valve 54 is seated in the nozzle body 52 in proximity with the orifice 50. Rotary valve 54 is rotatable about an axis 56 in order to select whether liquid will emerge from the orifice 50 as a relatively wide spray with relatively fine droplets or a stream with relatively coarse droplets which carries for a greater distance.

Figure 2:
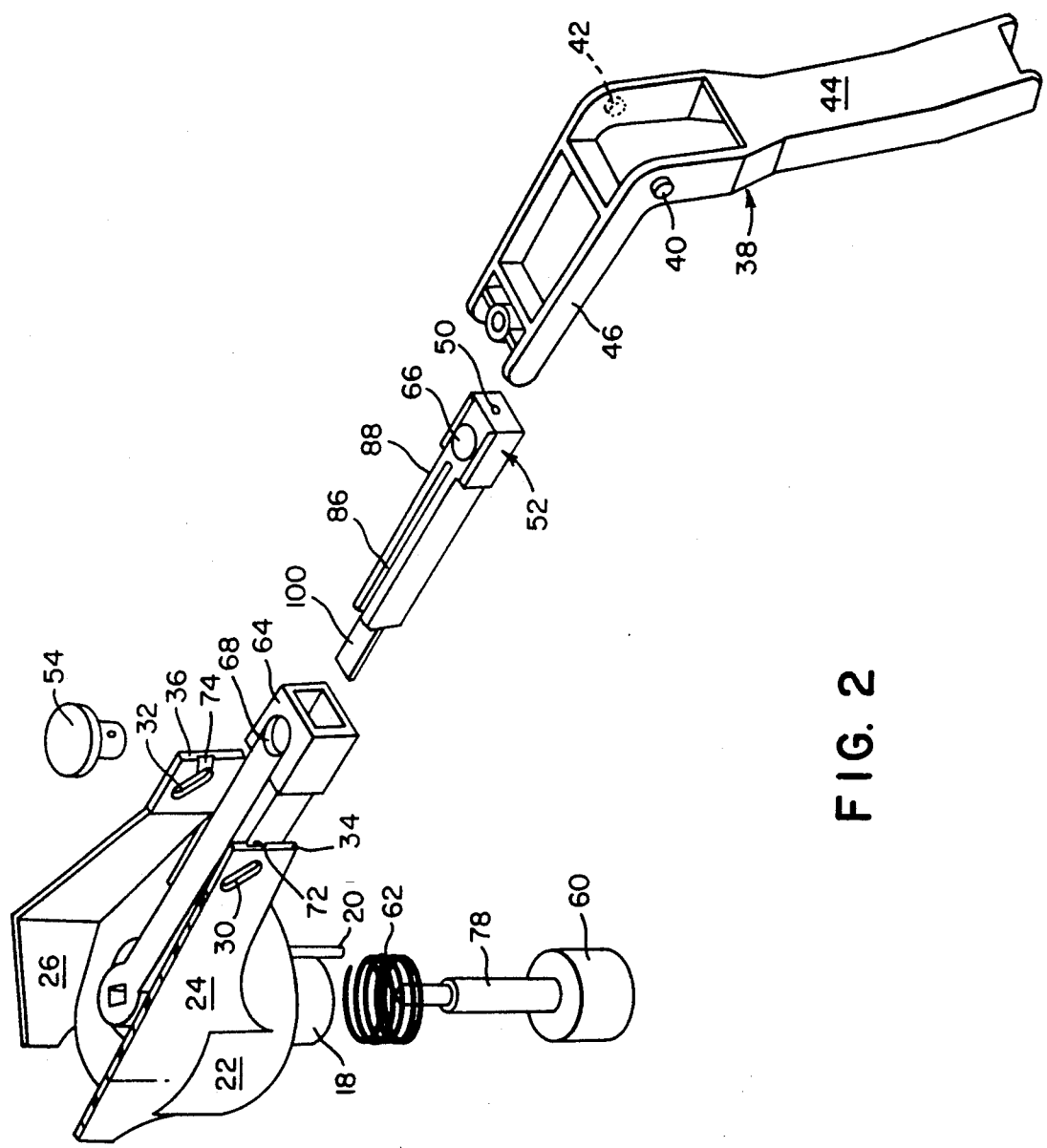
FIG. 2 is an exploded view, in perspective, of five main elements comprising the pump.

Referring now to FIG. 2, it is seen that the pump 16 is essentially comprised of five major components which are easy to assemble. The components include the handle 38, the valve body 52, a rotary valve 54, the base 20, a piston 60 and a coil spring 62. Valve body 52 is received in a valve body sleeve 64 and retained therein by rotary valve 54 which seats in valve seat 66 while registering with a round opening 68 in the valve sleeve body 64. Pivot pins 40 and 42 on the L-shaped handle 38, snap fit into arcuant slots 30 and 32 after being slid through grooves 72 and 74 at the front ends 34 and 36 of the flanges 24 and 26 on the base 16. The actuating leg 46 of the handle 38 snap-fits over the free end 76 of a piston rod 78 extending from the piston 60 to hold the piston within the cylinder 18 against the bias of spring 62.

Figure 3:
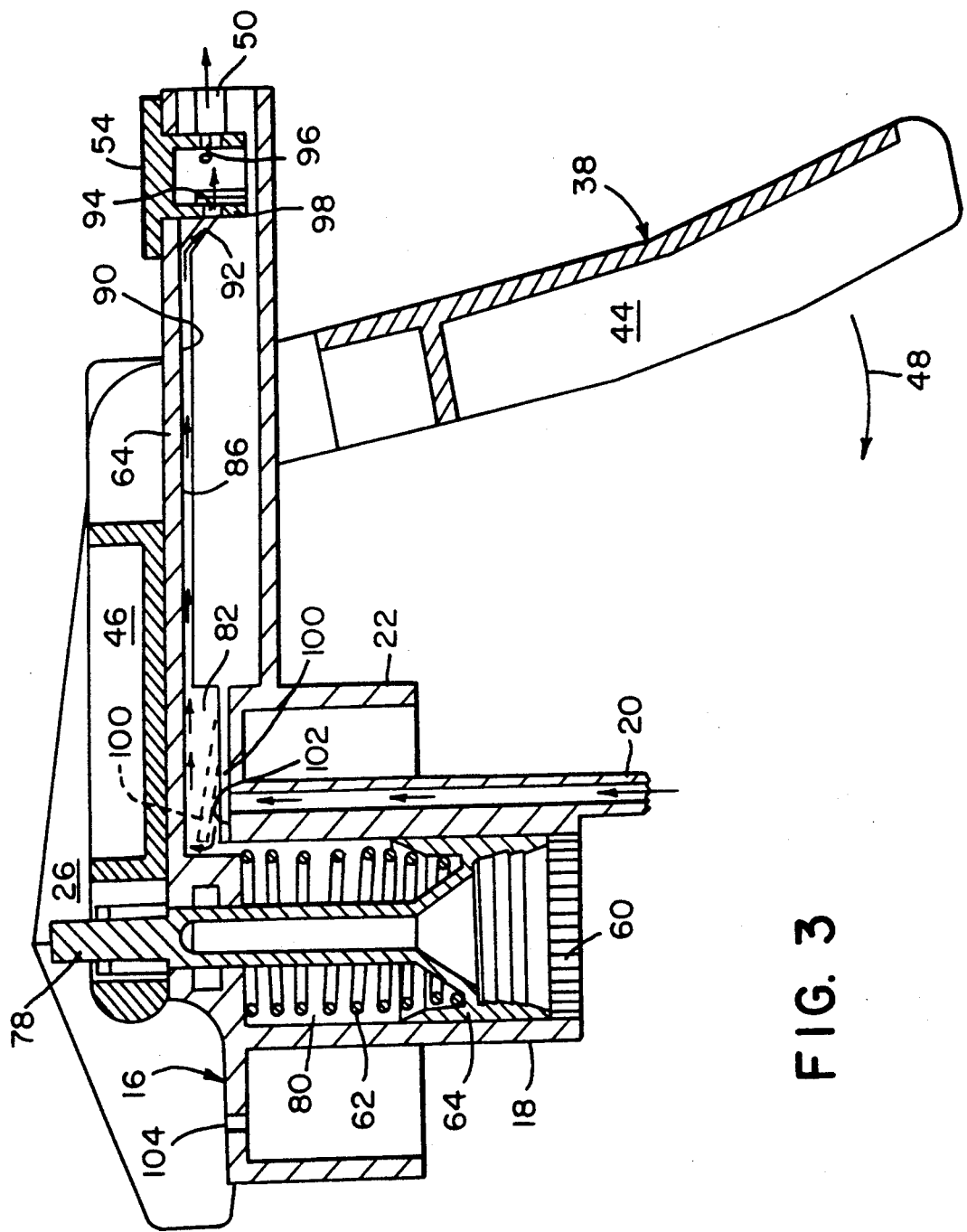
FIG. 3 is a side elevational view showing the assembled components of the pump and their operation.

Referring now to FIG. 3, FIG. 3 shows the elements of FIG. 2 assembled and in cross section thus illustrating the operation of the pump 16. The cylindrical member 18 defines a chamber 80 therein in which the spring 62 and piston are received. The spring 62 bears against the piston 60 via a retainer 64. When the handle 38 is rotated in the direction of arrow 48 via pivot pins 40 and 42, the piston rod 78 is lifted against the bias of the spring 62. This forces liquid within the chamber 80 to flow out of the chamber and into a passage way 82 within the valve body sleeve 64. The passageway 82 communicates with a groove 86 in the top surface 88 of the valve body 52, which groove cooperates with the undersurface 90 of the valve body sleeve 64 to form a channel so that the liquid flows to a slanted port 92. The slanted port 92 is in alignment with the rotary valve 54. More specifically, the slanted port 92 is in alignment with apertures 94 and 96 in a hollow cylindrical metering element 98 forming part of the valve 54. The apertures 94 and 98 selectively align with the aperture 50 in the valve body 52 which allows the liquid to flow out of the pump 16 as either a relatively fine spray, if the aperture 94 is aligned with the outlet 50, or as a stream if the aperture 96 is aligned with the outlet 50.

Upon releasing the handle 38, the compressed coil spring 62 presses via the spring retainer 64 against the the piston 60 urging the handle to return to the FIG. 3 position as the piston rod 78 pulls the leg 46 of the handle down. As the piston 60 moves downwardly within the chamber 80, a partial vacuum is created in the chamber 80 which causes a check valve formed as a vane 100 overlying the top 102 of the dip tube 20 to open as liquid in the container can flows up the dip tube to relieve the vacuum in chamber 80. A vent hole 104 in the top of base 16 allows atmospheric air to pressurize the liquid in the container 10 with respect to the chamber 80 upon a partial vacuum being created in the chamber. After a pressure equilibrium is reached between the chamber 80 and the interior of the container 10, the liquid stops flowing into the chamber; however, the chamber is now charged with another quantity of liquid which can be ejected upon squeezing the handle 38 to rotate in the arrow 48. Thus, the cycle can be repeated again until liquid is pumped out of the container 10 in discrete quantities.

Figure 4:
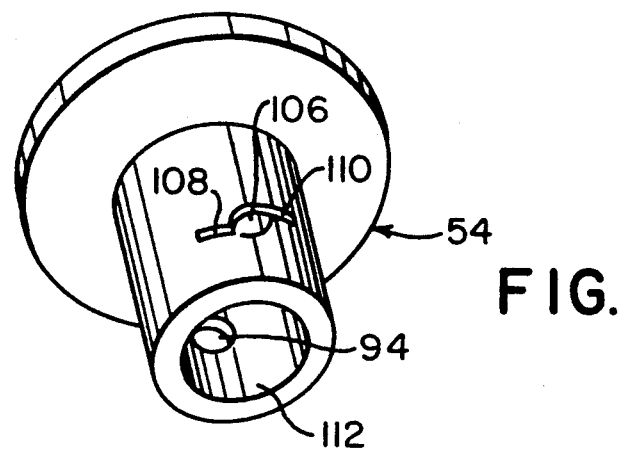
FIG. 4 is an enlarged perspective view of a rotary valve positioned just upstream of a dispensing nozzle of the pump.
Figure 5:
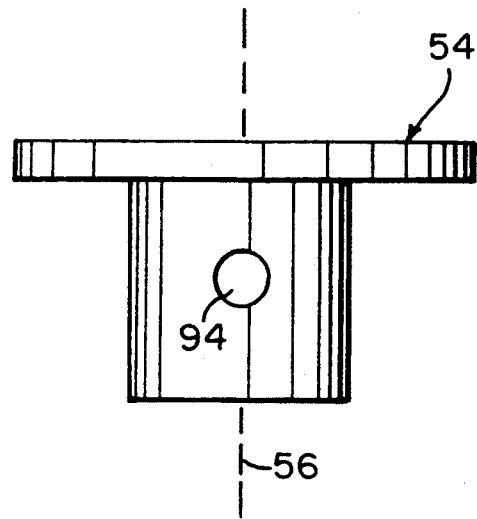
FIG. 5 is a side view of one side of the rotary valve of FIG. 4.
Figure 6:
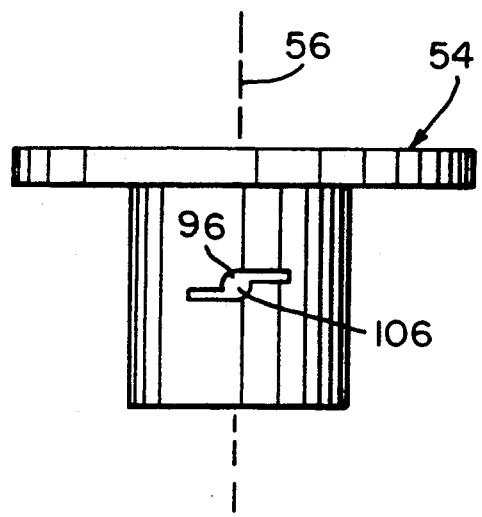
FIG. 6 is a side view of the opposite side of the rotary valve of FIG. 4.

Referring now to FIGS. 4–6, it is seen the aperture 94 is substantially round which produces a stream of liquid when the aperture 94 is aligned with the nozzle 50. When the aperture 96 is aligned with the nozzle 50, a spray is produced because the aperture 96 has a central portion 106 which is arcuate that merges into lateral slots 108 and 110. The hollow interior 112 of the rotary valve 54 serves as a reservoir to retain a quantity of fluid for ejection upon subsequently squeezing the handle 38 to rotate it in the direction of arrow 48 (FIGS. 1 and 3). The liquid remaining in the reservoir 112 in combination with liquid remaining in the groove 86 in effect seals the passage 82 so that When a vacuum is created in the piston chamber 80 (FIG. 3) and the passage way 82, the check valve provided by the vane 100 will open to relieve the vacuum. This is because the liquid in the channel formed by the groove 86 has a resistance to flow which is greater than the elasticity of the vane 100.

The pump 16 configured in accordance with the aforedescribed construction and arrangement of parts has a minimal number of parts and can be rapidly assembled by semi-skilled labor, yet performs competitively with more expensive pumps. In addition, since the cylindrical portion 18 containing the piston 60 is located within the mouth 14 defined by the neck 12 of the container 10, the pump has a relatively low profile so that when the pump 16 is mounted on the container, less space is consumed.

Without further elaboration, it is believed that one skilled in the art can, using the preceding description, utilize the present invention to its fullest extent.

What is claimed is:

1. A dispensing pump for mounting in the mouth of a container having a liquid therein, comprising:

a base having a chamber for receiving a liquid, the chamber extending in a first longitudinal direction for receipt through the mouth of the container; the base including a sleeve extending laterally with respect to the chamber and in communication therewith for dispensing liquid from the container and the base including a hole therein communicating with a dip tube for the chamber in the base with a liquid from the container, the hole being covered by a vane which serves as a check valve;

a piston within the chamber, the piston having an axially projecting rod extending therefrom into he base and being biased away from the base by a spring;

a handle movably mounted on the base and engaging the rod for moving the piston upwardly against the bias of the spring when pressed toward the container; the handle being L-shaped and having one leg extending over the base and another leg extending transversely of the sleeve, the handle being pivoted to the base and connected to a portion of the axially projecting rod extending through the base, whereby pivoting the handle in one direction lifts the rod to move the piston against the bias of the spring to eject liquid from the pump;

a rotary dispensing valve disposed within the sleeve to rotate about an axis normal to the sleeve, the rotary dispensing valve including a cylindrical wall defining a central chamber and first and second apertures communicating with the central chamber and configured to release liquid from the pump as a stream and as a spray of relatively fine droplets, respectively; and the dispensing valve further including a relatively narrow channel in communication with the chamber wherein liquid in the channel has a greater resistance to flowing back toward the chamber than the elasticity of the vane which serves as the check valve closing the hole in the base in communication with the dip tube, so that the chamber is filled with liquid from the container when the handle is released to create a vacuum within the chamber.

2. The dispensing pump of claim 1, wherein the pump comprises five main separate components, molded of plastic material and assemblable into the pump.

3. The dispensing pump of claim 1, wherein, when the mouth of the container opens upwardly, the chamber extends within the container with the piston and spring below the base and the axially projecting rod extending upwardly toward the base.

* * * * *